US009886698B2

(12) United States Patent
Ramsey et al.

(10) Patent No.: US 9,886,698 B2
(45) Date of Patent: Feb. 6, 2018

(54) AUGMENTED REALITY PRODUCT BROCHURE APPLICATION

(71) Applicant: DREAMWELL, LTD, Las Vegas, NV (US)

(72) Inventors: Bradley S. Ramsey, Atlanta, GA (US); Michael T. Brady, Atlanta, GA (US); Mari C. Brady, Atlanta, GA (US); Erich P. Meier, Atlanta, GA (US)

(73) Assignee: DREAMWELL, LTD., Las Vegas, NV (US)

( * ) Notice: Subject to any disclaimer, the term of this patent is extended or adjusted under 35 U.S.C. 154(b) by 0 days.

(21) Appl. No.: 14/801,867

(22) Filed: Jul. 17, 2015

(65) Prior Publication Data

US 2016/0026724 A1 Jan. 28, 2016

Related U.S. Application Data

(60) Provisional application No. 62/028,987, filed on Jul. 25, 2014.

(51) Int. Cl.
 *G09G 5/00* (2006.01)
 *G06Q 30/02* (2012.01)
 *G06T 11/60* (2006.01)
 *G06T 19/00* (2011.01)
 *G06K 9/20* (2006.01)
 *G06K 9/32* (2006.01)

(52) U.S. Cl.
 CPC ....... *G06Q 30/0241* (2013.01); *G06K 9/2081* (2013.01); *G06K 9/325* (2013.01); *G06K 9/3233* (2013.01); *G06T 11/60* (2013.01); *G06T 19/006* (2013.01)

(58) Field of Classification Search
 None
 See application file for complete search history.

(56) References Cited

U.S. PATENT DOCUMENTS

| 2007/0273644 | A1* | 11/2007 | Mondine Natucci | G06T 19/006 345/156 |
|---|---|---|---|---|
| 2011/0282537 | A1* | 11/2011 | Yamasaki | G06F 3/017 701/31.4 |
| 2014/0071165 | A1* | 3/2014 | Tuchschmid | G09B 23/30 345/633 |
| 2014/0100997 | A1* | 4/2014 | Mayerle | G06Q 30/0643 705/27.2 |
| 2014/0363801 | A1* | 12/2014 | Samosky | G09B 5/02 434/267 |

FOREIGN PATENT DOCUMENTS

WO  WO2014050959  *  3/2014  ........... G02B 27/017

* cited by examiner

*Primary Examiner* — Peter Hoang
(74) *Attorney, Agent, or Firm* — Cantor Colburn LLP (57) ABSTRACT

A method for viewing an augmented reality product brochure for a mattress product on a computing device is provided. The method includes capturing an image corresponding to the mattress product with a camera of the computing device and retrieving the augmented reality product brochure corresponding to the image from a memory of the computing device. The method also includes displaying the augmented reality product brochure on a user interface of the computing device, wherein the augmented reality product brochure includes a representation of the mattress product and modifying the representation of the mattress product based on receiving one or more instructions from the user.

9 Claims, 8 Drawing Sheets

Fig. 9

AUGMENTED REALITY PRODUCT BROCHURE APPLICATION

CROSS-REFERENCE TO RELATED APPLICATIONS

This application is a NON-PROVISIONAL of and claims the benefit of U.S. Application No. 62/028,987, filed Jul. 25, 2014, which is incorporated herein by reference in its entirety

BACKGROUND

The present disclosure generally relates to an augmented reality product brochure for a mattress product and more particularly to an augmented reality product brochure application for a mattress product.

Most currently available mattress products include various components and layers that are not visible to a customer viewing the mattress product. Accordingly, it is often difficult for a customer to understand and appreciate the complex construction of the mattress product. This lack of understanding of the construction of the mattress product may hinder the customer's ability to compare different mattress products and to select a mattress product that is best suited to their needs and desires.

Accordingly, what is needed is an augmented reality product brochure application for a mattress product that allows a customer to easily learn about and understand the construction of the mattress product.

BRIEF SUMMARY

Embodiments include a method for viewing an augmented reality product brochure for a mattress product on a computing device. The method includes capturing an image corresponding to the mattress product with a camera of the computing device and retrieving the augmented reality product brochure corresponding to the image from a memory of the computing device. The method also includes displaying the augmented reality product brochure on a user interface of the computing device, wherein the augmented reality product brochure includes a representation of the mattress product and modifying the representation of the mattress product based on receiving one or more instructions from the user.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features and advantages of the invention are apparent from the following detailed description taken in conjunction with the accompanying drawings in which:

DETAILED DESCRIPTION

In exemplary embodiments an augmented reality product brochure application is provided. The augmented reality product brochure application is configured to provide customers with an interactive brochure of a mattress product that allows the customer to learn about the features and construction of the mattress product and to interact with the product in an augmented reality environment. In exemplary embodiments, the interactions that are provided by the augmented reality product brochure application are interactions that are not possible in the real world without causing damage to the mattress product. For example, the interactions may include selectively adding and removing one or more layers of the mattress product. Throughout this description, the augmented reality product brochure application will be described in detail with reference to viewing an augmented reality product brochure for a mattress product.

Figure 1:
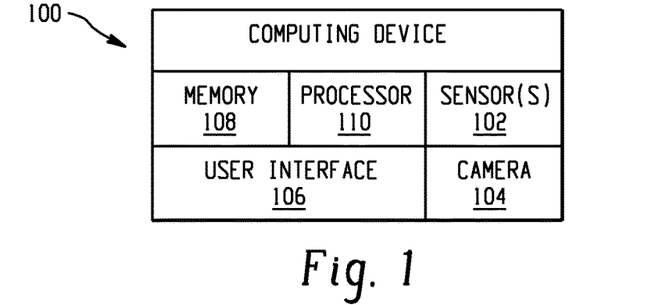
FIG. 1 illustrates a block diagram of an computing device in accordance with an exemplary embodiment.

Referring now to FIG. 1, a block diagram of a computing device 100 for executing an augmented reality product brochure application in accordance with an exemplary embodiment is shown. As illustrated, the computing device 100 includes, but is not limited to, one or more sensors 102, a camera 104, a user interface 106, a memory 108, and a processor 110. In exemplary embodiments, the computing device 100 may be any suitable mobile computing device such as a smartphone or a tablet and the user interface 106 may be a well-known touch screen display.

In exemplary embodiments, the camera 104 of the computing device can be used to capture an image that will be used to select the augmented reality product brochure to be displayed by the augmented reality product brochure application. In exemplary embodiments, the captured image may be an actual image of the physical product, for example a picture of an actual mattress product, or it may be another image that is associated with the mattress product. For example, the captured image may be a piece of marketing material that was developed by the manufacturer of the mattress product that is associated with a specific mattress product. In exemplary embodiments, the memory 108 of the computing device 100 may be used to store on ore more augmented reality product brochures for use by the augmented reality product brochure application.

In exemplary embodiments, the computing device 100 may be configured to connect to the Internet to obtain augmented reality product brochures. For example, the augmented reality product brochure application may capture an image corresponding to a mattress product and determine if an augmented reality product brochure corresponding to that product is stored in the memory 108. If there is no augmented reality product brochure corresponding to the product stored in the memory 108, the computing device 100 may transmit the capture image to a web service that can provide a corresponding augmented reality product brochure to the computing device 100.

In exemplary embodiments, the one or more sensors 102 can be used by the augmented reality product brochure application to allow the user to interact with the augmented reality product brochure. In one embodiment, the sensor 102 may include a compass, accelerometer and/or gyroscope that can be used to modify the display of the product based on the orientation of the computing device 100. In one embodiment, when a customer captures an image of a product the computing device 100 may use the one or more sensors 102 to detect the relative position or orientation of the product to the computing device and the augmented reality product brochure application may use this information in combination with current readings from the one or more sensors 102 to modify the position or orientation of the product displayed on the user interface 106 of the computing device. For example, if a customer captures an image of a product from a bottom portion of the product the augmented reality product brochure application may automatically update the position or orientation of the product on the user interface as the user walks around the product. In addition, the augmented reality product brochure application may be configured to zoom in and out based on the computing device moving closer or further away from the product.

In exemplary embodiments, the processor 110 may be a digital signal processing (DSP) circuit, a field-programmable gate array (FPGA), an application specific integrated circuits (ASICs) or the like. The processor 110 can be any custom made or commercially available processor, a central processing unit (CPU), an auxiliary processor among several processors, a semiconductor based microprocessor (in the form of a microchip or chip set), a macroprocessor, or generally any device for executing instructions.

Figure 2:
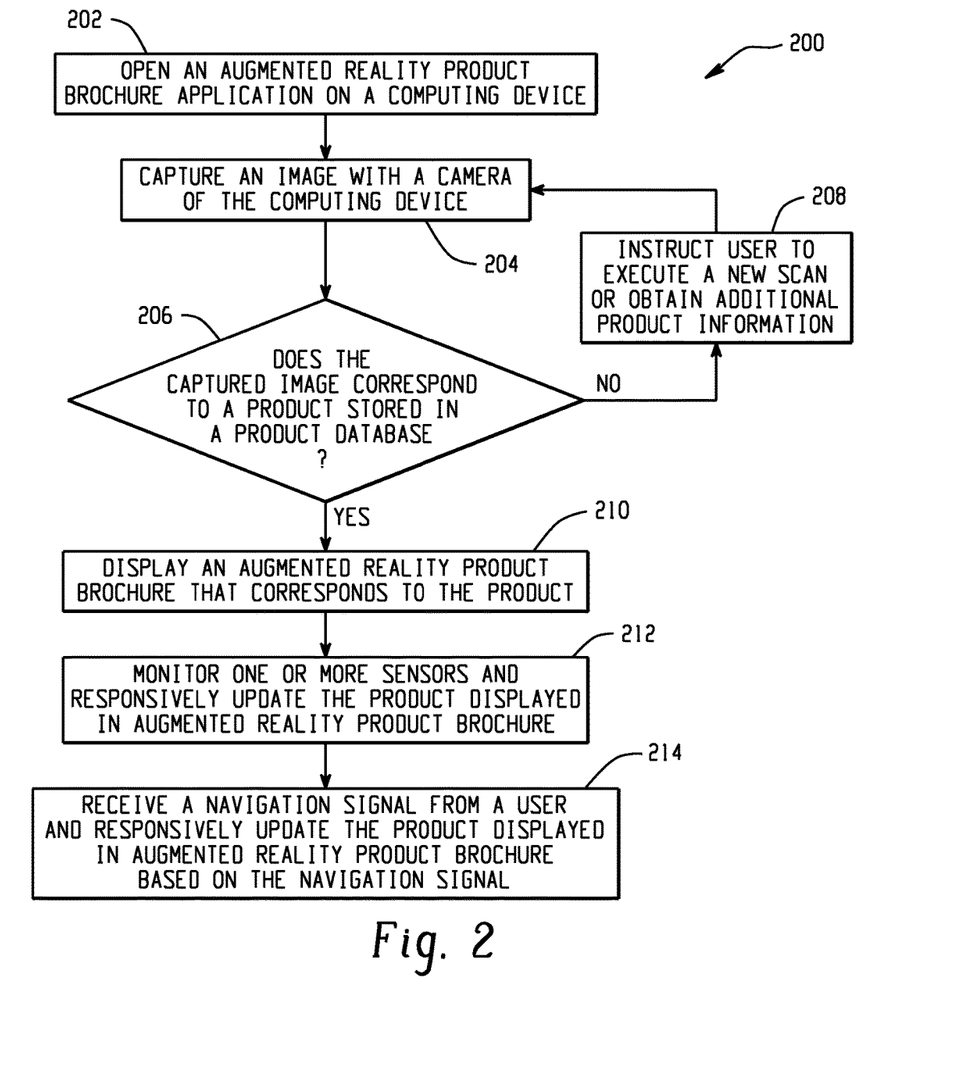
FIG. 2 illustrates a flow chart diagram of a method for providing an augmented reality product brochure application on a computing device in accordance with an exemplary embodiment.

Referring now to FIG. 2, a flow chart diagram of a method 200 for providing an augmented reality product brochure application on a computing device in accordance with an exemplary embodiment is shown. As shown at block 202, the method 200 includes opening an augmented reality product brochure application on a computing device. Next, as shown at block 204, the method 200 includes capturing an image with a camera of the computing device. As shown at decision block 206, the method 200 also includes determining if the captured image corresponds to a mattress product stored in a product database. If the captured image corresponds to a mattress product stored in a product database, the method 200 proceeds to block 210 and displays an augmented reality product brochure of the mattress product that corresponds captured image. Otherwise, the method 200 proceeds to block 208 and instructs a user to execute a new product image capture and/or attempts obtain additional product information. Next, as shown at block 212, the methods 200 includes monitoring one or more sensors and dynamically updating the mattress product displayed in augmented reality product brochure. As shown at block 214, the methods 200 also includes receiving a navigation signal from a user and responsively updating the mattress product displayed in augmented reality product brochure based on the navigation signal.

Figure 3:
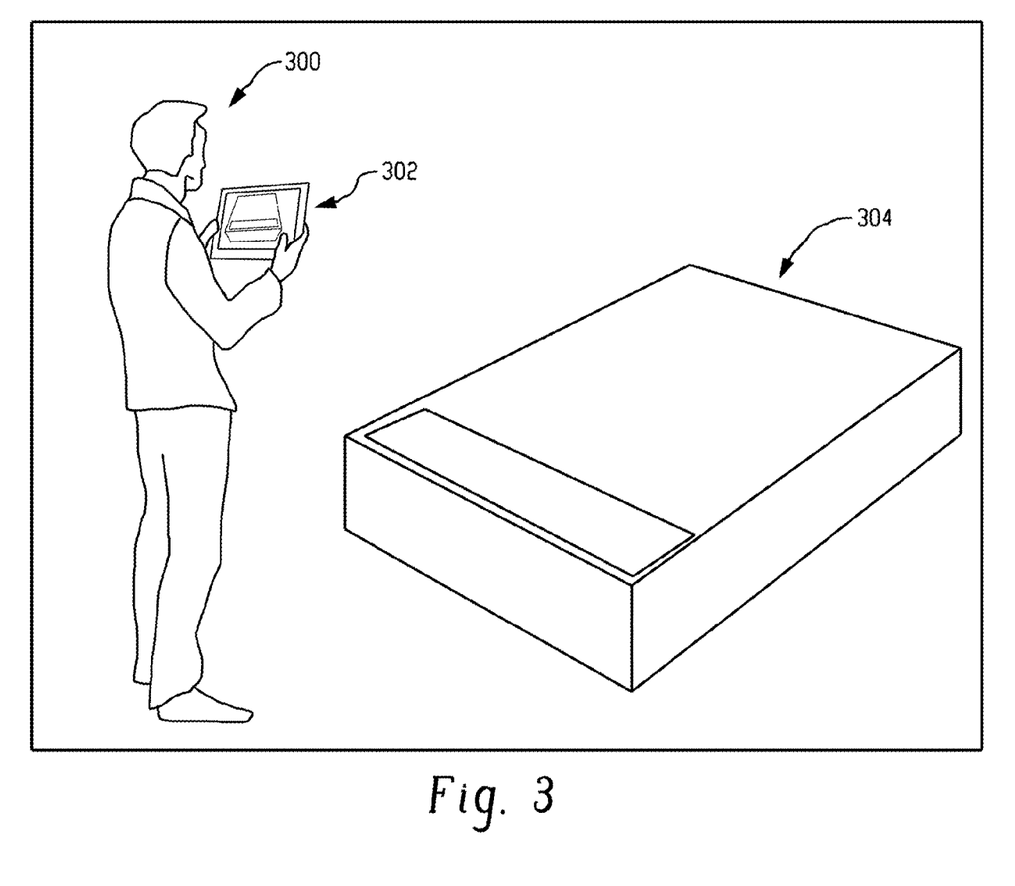
FIG. 3 illustrates a schematic view of a person using a augmented reality product brochure application on a computing device a in accordance with an exemplary embodiment.

Referring now to FIG. 3 a schematic view of a customer 300 using an augmented reality product brochure application on a computing device 302 in accordance with an exemplary embodiment is shown. In exemplary embodiments, the customer 300 may use an augmented reality product brochure application on the computing device 302 to obtain information on a mattress product 304. The augmented reality product brochure application is configured to allow the customer 304 to interact with a virtual reality version of the mattress product to learn more about the mattress product in ways that would be difficult, if not impossible, with the physical mattress product. For example, if the mattress product 304 is a mattress that is constructed of multiple layers, the augmented reality product brochure may allow the customer to view the mattress product 304 with one or more layers selectively removed and to learn about the construction of each layer.

Figure 4:
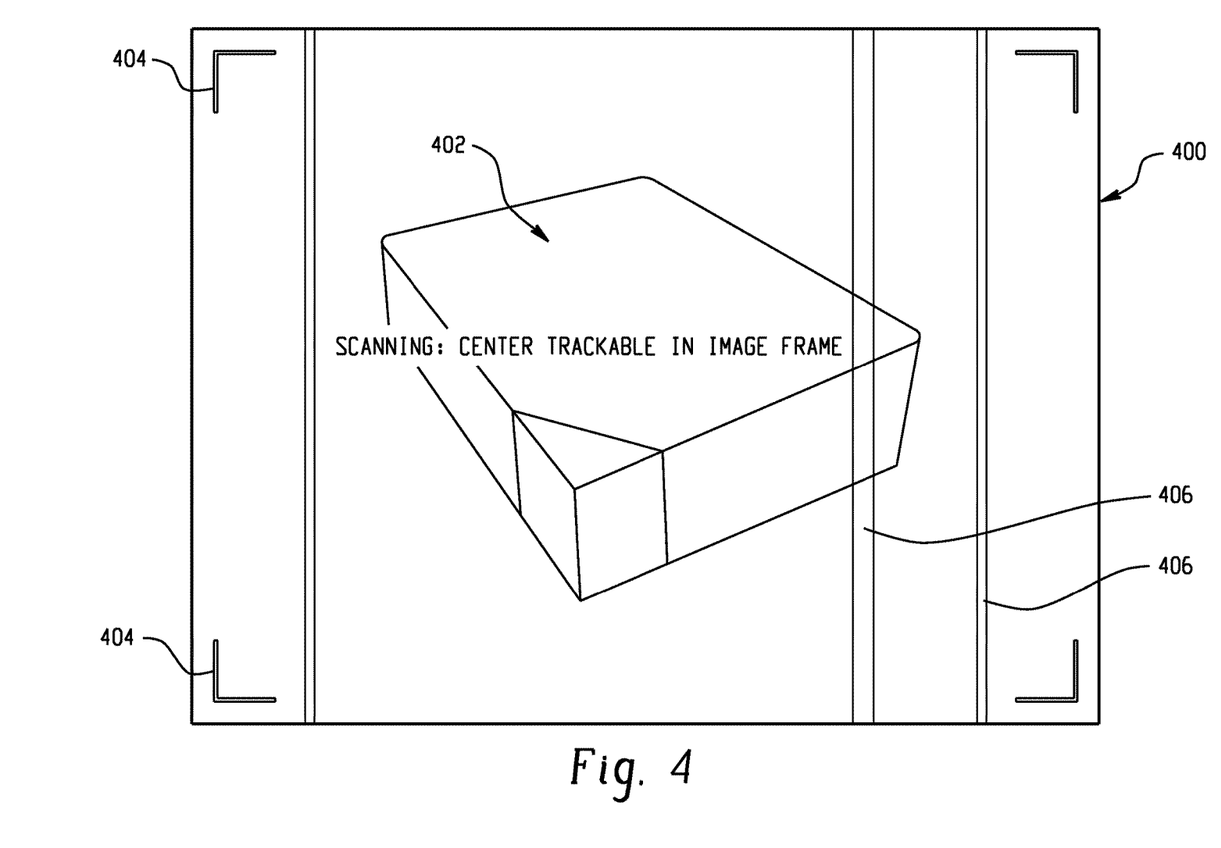
FIG. 4 illustrates a user interface for capturing a product image with the augmented reality product brochure application in accordance with an exemplary embodiment.

Referring now to FIG. 4 a user interface 400 for capturing an image corresponding to a mattress product 402 via the augmented reality product brochure application in accordance with an exemplary embodiment is shown. In exemplary embodiments, the user interface 400 may include one or more alignment indicia 404 that can be used by the customer ensure that the image will include the entire mattress product 402. In addition, the user interface 400 may include one or more scanning indicia 406 which may be scanning lines that can vary in speed to let customers know the augmented reality product brochure application is functioning and scanning the mattress product 402.

Figure 5:
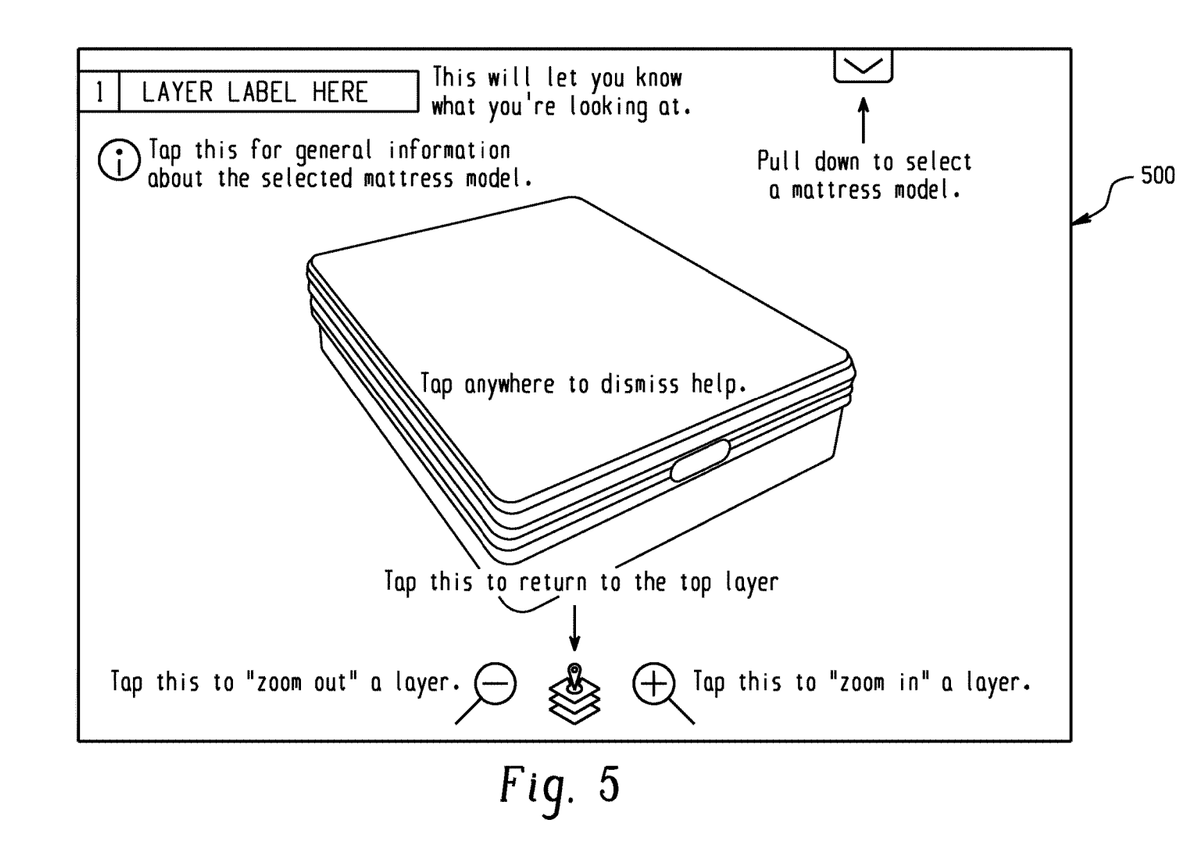
FIG. 5 illustrates a user interface including a help layer for viewing an augmented reality product brochure via the augmented reality product brochure application in accordance with an exemplary embodiment.

Referring now to FIG. 5 a user interface 500 including a help layer for viewing an augmented reality product brochure via the augmented reality product brochure application in accordance with an exemplary embodiment is shown. In exemplary embodiments, the help layer is overlaid across the user interface 500 and includes an explanation of the function of the various buttons and links on the user interface 500.

Figure 6:
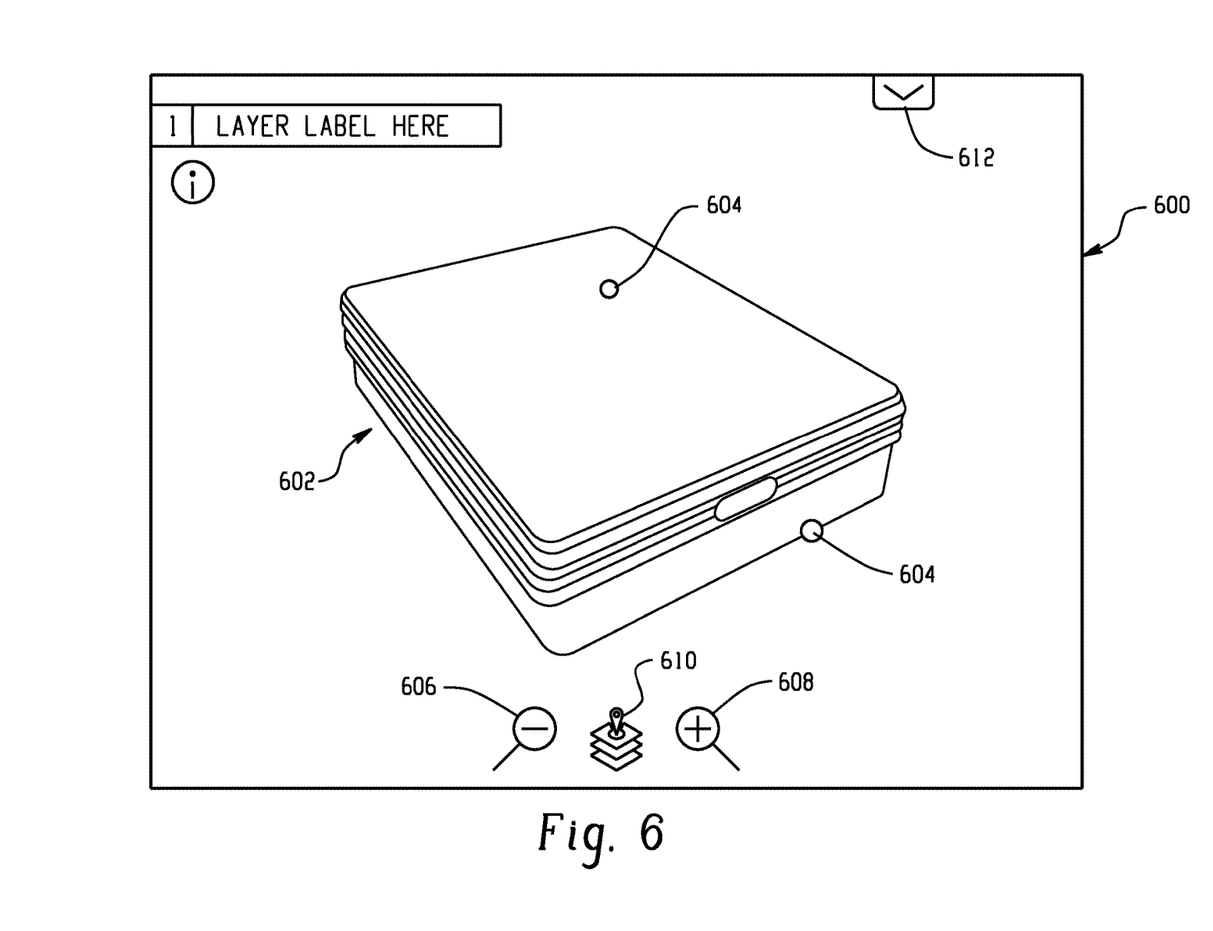
FIG. 6 illustrates a user interface for interacting with the augmented reality product brochure via the augmented reality product brochure application in accordance with an exemplary embodiment.

Referring now to FIG. 6 a user interface 600 for interacting with the augmented reality product brochure via the augmented reality product brochure application in accordance with an exemplary embodiment is shown. As illustrated, the user interface 600 includes a virtual mattress product 602 which corresponds to the mattress product associated with the captured image. The user interface 600 includes one or more hotspots 604 which are links that that activate the display of additional product information corresponding to the location of the hotspot 604 on the virtual mattress product 602. The user interface 600 also includes a remove layer icon 606, an add layer icon 608 and a return to top icon 610 that are used to selectively add and remove layers from the virtual mattress product 602. The user interface 600 further includes a mattress selector icon 612 that activates a drop down menu that a customer can use to manually select a virtual mattress product 602 to view.

Figure 7:
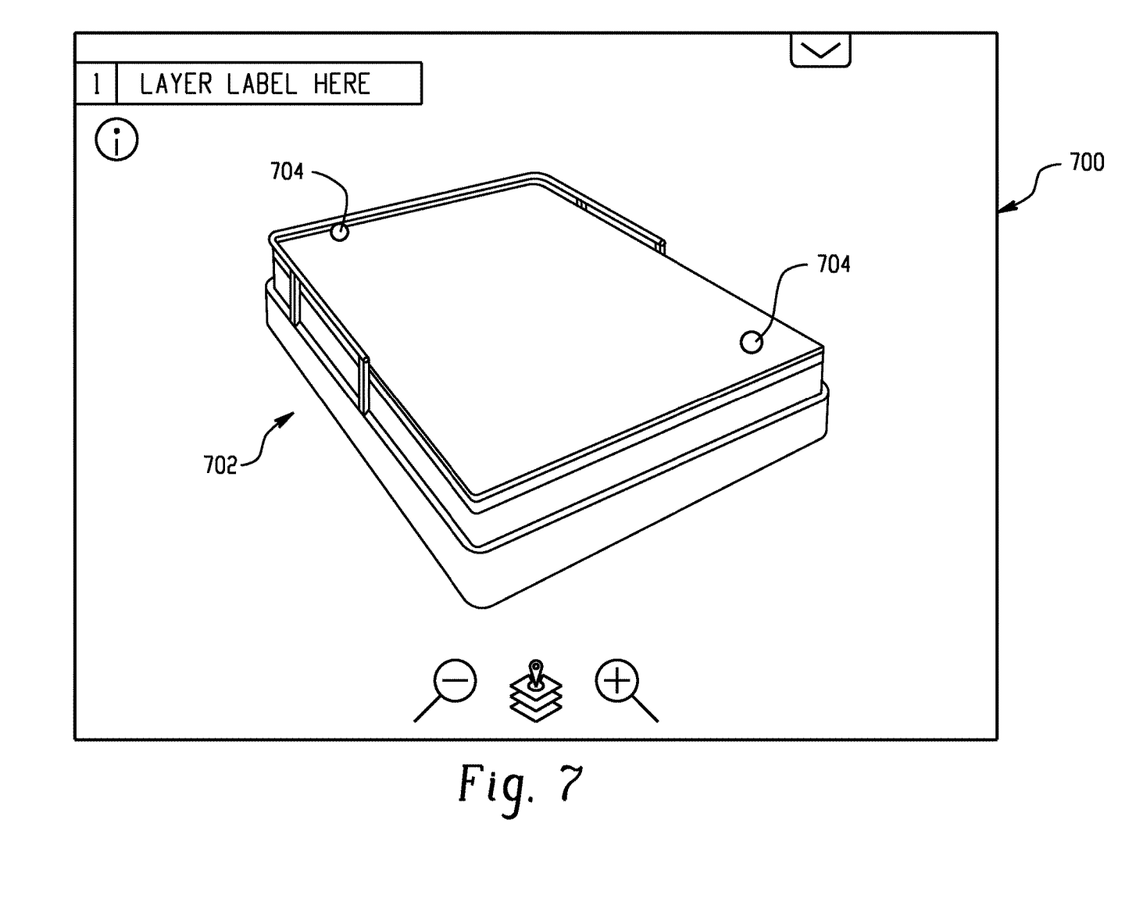
FIG. 7 illustrates a user interface for interacting with the augmented reality product brochure via the augmented reality product brochure application in accordance with an exemplary embodiment.

Referring now to FIG. 7 a user interface 700 for interacting with the augmented reality product brochure via the augmented reality product brochure application in accordance with an exemplary embodiment is shown. As illustrated, the user interface 700 includes a virtual mattress product 702 that has a top layer removed. The user interface 700 includes one or more hotspots 704 which are links that that activate the display of additional product information corresponding to the location of the hotspot 704 on the virtual mattress product 702.

Figure 8:
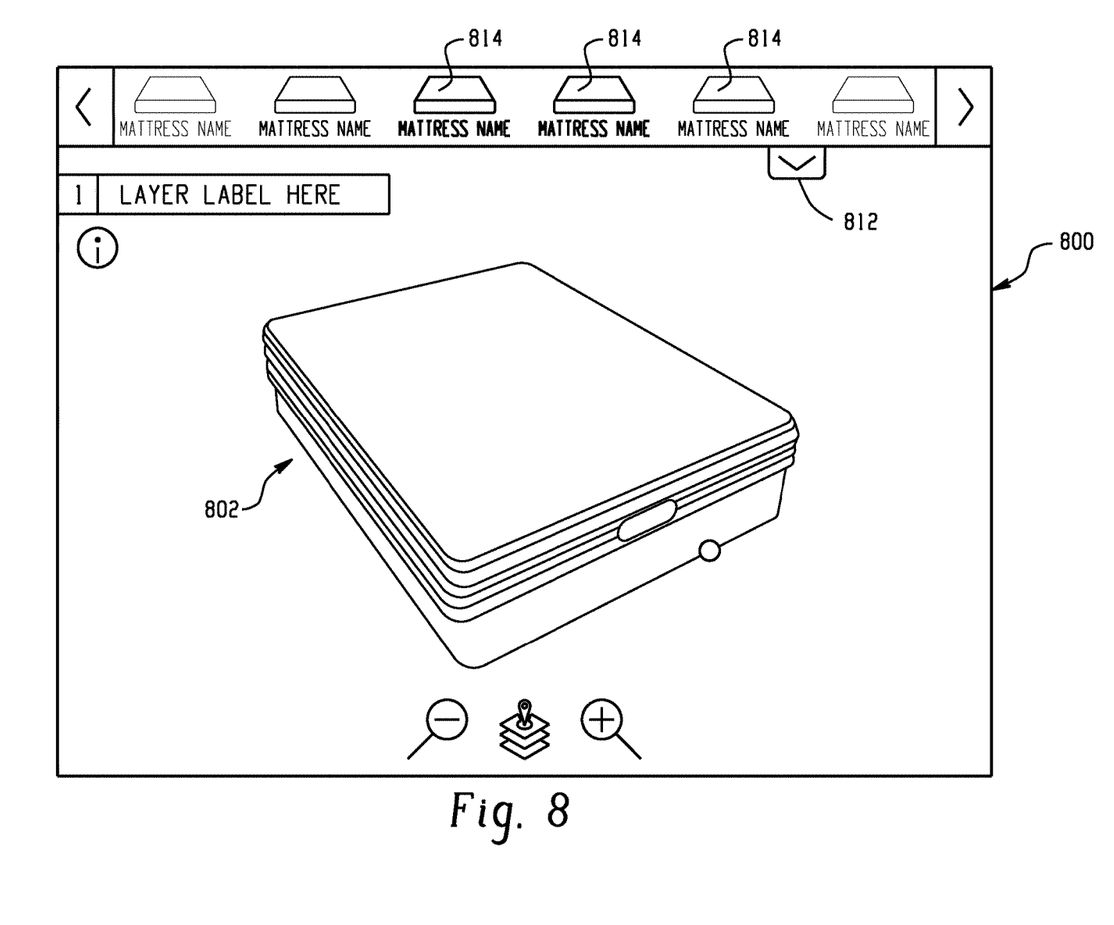
FIG. 8 illustrates a user interface for viewing an augmented reality product brochure via the augmented reality product brochure application in accordance with an exemplary embodiment.

Referring now to FIG. 8 a user interface 800 for viewing an augmented reality product brochure via the augmented reality product brochure application in accordance with an exemplary embodiment is shown. As illustrated, the user interface 800 includes a virtual mattress product 802 which corresponds to the mattress product associated with the captured image. The user interface 800 further includes a mattress selector icon 812 that activates a drop down menu that a customer can use to manually select a different virtual mattress product 814 to view.

Figure 9:
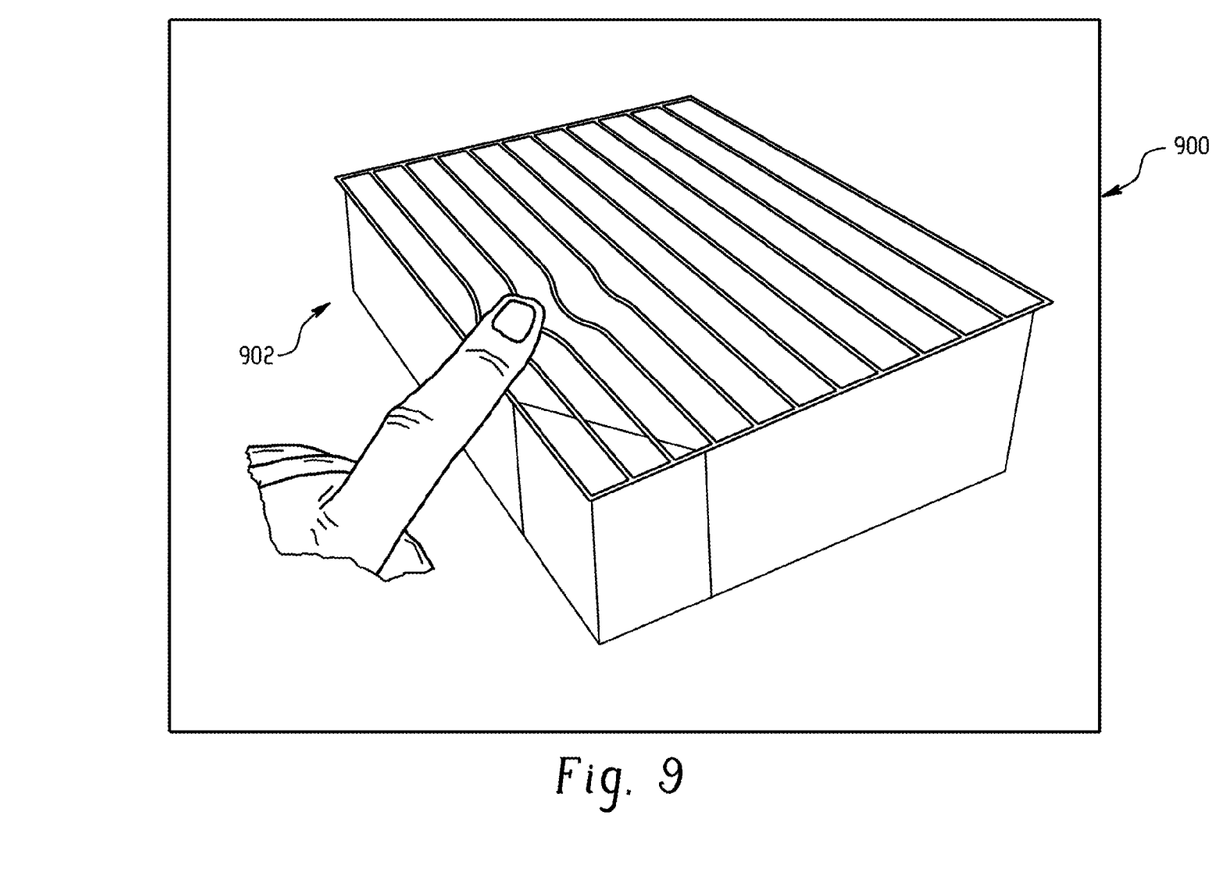
FIG. 9 illustrates a user interface for interacting with the augmented reality product brochure via the augmented reality product brochure application in accordance with an exemplary embodiment.

Referring now to FIG. 9 a user interface for interacting with the augmented reality product brochure via the augmented reality product brochure application in accordance with an exemplary embodiment is shown. As illustrated, the user interface 900 includes a virtual mattress product 902 which corresponds to the mattress product associated with the captured image. In exemplary embodiments, the augmented reality product brochure application is configured to allow the user to interact with the exposed or top layer of the virtual mattress product 902. For example, users can interact with a memory foam layer by tapping or dragging their finger over the user interface. In response to the user's touch, the virtual mattress product 902 will deform to mimic the physical properties of the mattress product associated with the captured image. For example, the deformation may slowly fade away to mimic the physical properties of a foam layer.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The components and materials described hereinafter as making up the various embodiments are intended to be illustrative and not restrictive. Many suitable components and materials that would perform the same or a similar function as the materials described herein are intended to be embraced within the scope of embodiments of the present invention. While embodiments of the present invention have been disclosed in exemplary forms, it will be apparent to those skilled in the art that many modifications, additions, and deletions can be made therein without departing from the spirit and scope of the invention and its equivalents, as set forth in the following claims.

What is claimed is:

1. A method for viewing an augmented reality product brochure for a mattress product on a computing device, the method comprising:
   capturing an image corresponding to the mattress product with a camera of the computing device;
   retrieving the augmented reality product brochure corresponding to the image from a memory of the computing device;
   displaying the augmented reality product brochure on a user interface of the computing device, wherein the augmented reality product brochure includes a virtual representation of the mattress product;
   modifying the representation of the mattress product within the augmented reality product brochure based on receiving one or more instructions from the user, wherein modifying the representation of the mattress product includes removing one or more layers of the mattress product that would cause physical damage to the mattress product if performed in a real world environment;
   receiving a user input that includes a user touching a layer of the representation of the mattress product; and
   responsive to the user input, displaying an image that shows the layer of the representation of the mattress product deforming to mimic the physical properties of the layer of the representation of the mattress product.

2. The method of claim 1, wherein the image corresponding to the mattress product includes an actual image of the mattress product.

3. The method of claim 1, wherein the image corresponding to the mattress product includes a piece of marketing material associated with the mattress product.

4. The method of claim 1, wherein the augmented reality product brochure includes one or more hotspots that activate a display of additional product information corresponding to a location of the hotspot on the mattress product.

5. A computer program product for viewing an augmented reality product brochure for a mattress production a computing device, the computer program product comprising:
   a non-transitory storage medium readable by a processing circuit of the computing device and storing instructions for execution by the processing circuit for performing a method comprising:
   capturing an image corresponding to the mattress product with a camera of the computing device;
   retrieving the augmented reality product brochure corresponding to the image from a memory of the computing device;
   displaying the augmented reality product brochure on a user interface of the computing device, wherein the augmented reality product brochure includes a virtual representation of the mattress product;
   modifying the representation of the mattress product within the augmented reality product brochure based on receiving one or more instructions from the user, wherein modifying the representation of the mattress product includes removing one or more layers of the mattress product that would cause physical damage to the mattress product if performed in a real world environment;
   receiving a user input that includes a user touching a layer of the representation of the mattress product; and responsive to the user input, displaying an image that shows the layer of the representation of the mattress product deforming to mimic the physical properties of the layer of the representation of the mattress product.

6. The computer program product of claim 5, wherein the image corresponding to the mattress product includes an actual image of the mattress product.

7. The computer program product of claim 5, wherein the image corresponding to the mattress product includes a piece of marketing material associated with the mattress product.

8. The computer program product of claim 5, wherein the augmented reality product brochure includes one or more hotspots that activate a display of additional product information corresponding to a location of the hotspot on the mattress product.

9. A method for viewing an augmented reality product brochure for a mattress product on a computing device, the method comprising:
- capturing an image corresponding to the mattress product with a camera of the computing device;
- analyzing the image to determine an orientation the mattress product;
- retrieving the augmented reality product brochure corresponding to the image from a memory of the computing device;
- displaying the augmented reality product brochure on a user interface of the computing device, wherein the augmented reality product brochure includes a virtual representation of the mattress product, and
  - wherein an orientation of the virtual representation of the mattress corresponds to the orientation of the mattress product;
- modifying the representation of the mattress product within the augmented reality product brochure based on receiving one or more instructions from the user, wherein modifying the representation of the mattress product includes removing one or more layers of the mattress product that would cause physical damage to the mattress product if performed in a real world environment;
- receiving a user input that includes a user touching a layer of the representation of the mattress product; and
- responsive to the user input, displaying an image that shows the layer of the representation of the mattress product deforming to mimic the physical properties of the layer of the representation of the mattress product.

* * * * *